(12) United States Patent
Lin et al.

(10) Patent No.: US 7,555,224 B2
(45) Date of Patent: Jun. 30, 2009

(54) USING SUPERIMPOSED ASK LABEL IN AN ALL-OPTICAL LABEL SWAPPING SYSTEM AND METHOD THEREOF

(75) Inventors: Yu-Min Lin, Sijhih (TW); Maria C. Yuang, Hsinchu (TW); San-Liang Lee, Taipei (TW); Winston I. Way, Irvine, CA (US)

(73) Assignee: Industrial Technology Research Institute, Hsinchu (TW)

( * ) Notice: Subject to any disclaimer, the term of this patent is extended or adjusted under 35 U.S.C. 154(b) by 650 days.

(21) Appl. No.: 11/045,302

(22) Filed: Jan. 31, 2005

(65) Prior Publication Data

US 2006/0171393 A1 Aug. 3, 2006

(51) Int. Cl.
*H04B 10/04* (2006.01)
*H04J 14/00* (2006.01)

(52) U.S. Cl. ................. 398/185; 398/183; 398/198; 398/51

(58) Field of Classification Search ............. 398/185, 398/183, 186, 198, 182, 51, 54, 45; 370/392, 370/471, 529, 527
See application file for complete search history.

(56) References Cited

U.S. PATENT DOCUMENTS 6,819,878 B1 * 11/2004 King et al. .............. 398/189
7,340,168 B2 * 3/2008 Giles et al. .............. 398/47

OTHER PUBLICATIONS

Tomkos, Optical Packet Switching, Friday Morning, OFC 2003, p. 791-792.*

Nan Chi et al. ("Transmission and Transparent Wavelength Conversion of an Optically Labeled Signal using ASK/DPSK Orthogonal Modulation", IEEE Photonics Technology Letters, vol. 15, No. 5, May 2003, p. 760-762).*

Chi et al., *Transmission and Transparent Wavelength Conversion of an Optically Labeled Signal Using ASK/DPSK Orthogonal Modulation*, IEEE Photonics Technology Letters, May 2003, p. 760-762.

Ohm et al., *Quaternary Optical ASK-DPSK and Receivers With Direct Detection*, IEEE Photonics Technology Letters, Jan. 2003, p. 159-161.

Chi et al., *Experimental Demonstration of Cascaded Transmission and all-optical Label Swapping of Orthogonal IM/FSK Labelled Signal*, Electronics Ltters, Apr. 17th Apr. 2003, p. 676-678.

Lin et al., *Using Superimposed ASK Label in a 10-Gb/s Multihop All-Optical Label Swapping System*, Journal of Lightwave Technology, Feb. 2004, p. 351-361.

Tomkos, *Optical Packet Switching*, Friday Morning, OFC 2003, p. 791-792.

(Continued)

*Primary Examiner*—M. R. Sedighian
(74) *Attorney, Agent, or Firm*—Rabin & Berdo, P.C.

(57) ABSTRACT

An all-optical label swapping system and method superimposes a low-speed ASK label on top of a high-speed DC-balanced-line-coded ASK payload. An old ASK label is erased by modulating the combined payload and label signal with the inverse of the received ASK label. This ASK labeling technique requires only low speed external modulators and low speed optical receivers to perform the label swapping mechanism, and does not require sophisticated optical components.

8 Claims, 8 Drawing Sheets

OTHER PUBLICATIONS

Lin et al., *A Novel Optical Label Swapping Technique Using Erasable Optical Single-Sideband Subcarrier Label*, IEEE Photonics Technology Letters, Aug. 2000. p. 1088-1090.

Guillemot et al., *Transparent Optical Packet Switching: The European ACTS KEOPS Project Approach*, Journal of Lightwave Technology, Dec. 1998, p. 2117-2134.

* cited by examiner

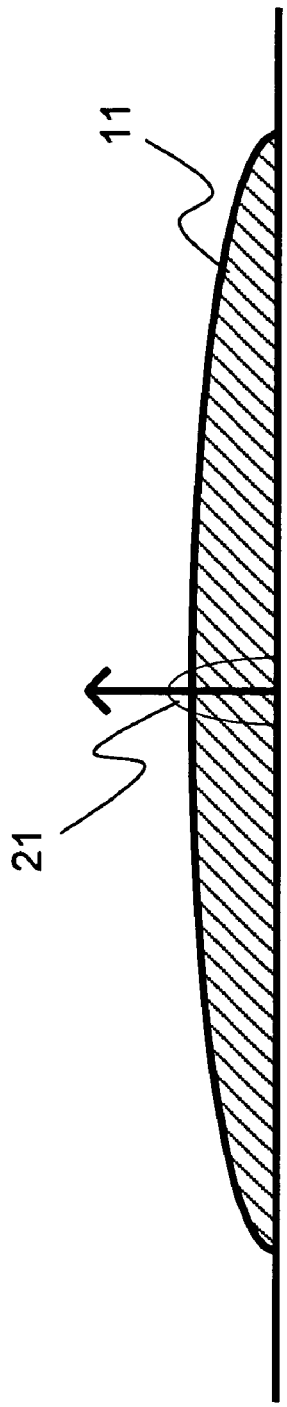
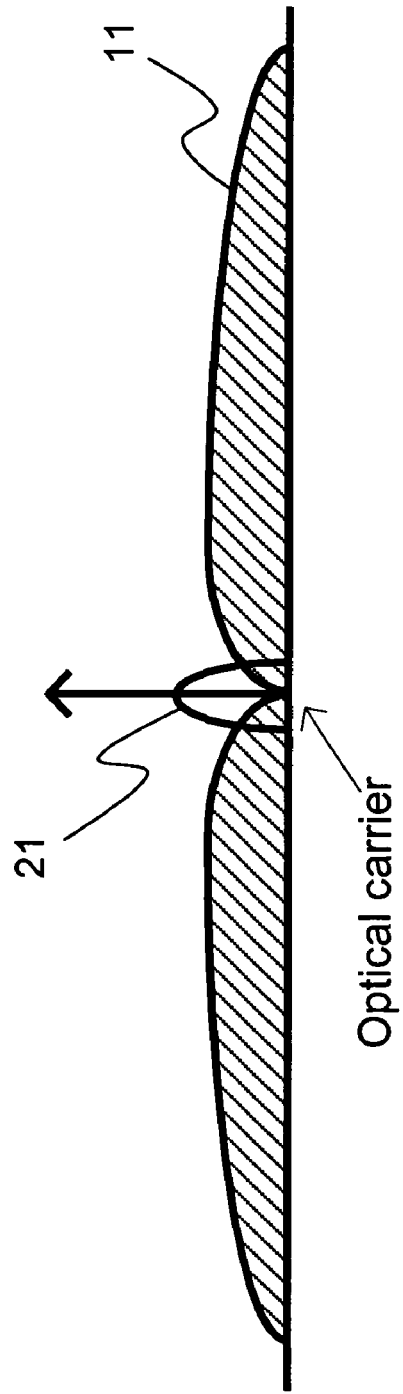

US 7,555,224 B2

USING SUPERIMPOSED ASK LABEL IN AN ALL-OPTICAL LABEL SWAPPING SYSTEM AND METHOD THEREOF

BACKGROUND OF THE INVENTION

1. Field of Invention

This invention relates to an all-optical label swapping system and swapping method, and more particularly to an all-optical label swapping system and swapping method using a superimposed ASK label.

2. Related Art

Dense-wavelength-division-multiplexing (DWDM) transmission and generalized multi-protocol label switching (GMPLS) are considered the key enabling technologies for the next generation optical Internet backbone. In a GMPLS-based optical switch/router, the low-speed label associated with a high-speed payload is extracted, processed, and replaced at every intermediate network switching node. Meanwhile, the high-speed payload is optically switched and controlled by the electrically processed label to an appropriate output fiber as an entirely untouched entity. Therefore, a GMPLS-based optical switch/router is transparent to various payload data rates, 10 Gbps, 40 Gbps, etc., and formats, SONET, Gigabit, etc., and can use economically realizable processors for the low-speed labels, e.g., a Fast Ethernet.

Many optical label swapping techniques have been proposed. Among them, the time-domain multiplexing technique requires extremely precise control of timing and alignment. The subcarrier multiplexed labeling technique requires extra bandwidth beyond traditional baseband payload, and requires stringent wavelength accuracy and stability if a fixed optical notch filter, e.g., a fiber Bragg grating, is used to erase the old label. The orthogonal modulation technique, including ASK/FSK and ASK/DPSK, exhibits severe transmission system penalty due to its inherently low extinction ratio of high-speed payload signals.

SUMMARY OF THE INVENTION

The present invention is to provide an all-optical label swapping system and swapping method to solve the problems of the conventional art.

A modulation scheme that superimposes a low-speed ASK label on top of a high-speed DC-balanced line-coded ASK payload is proposed. An old ASK label is erased by modulating the combined payload and label signal with the inverse of the received ASK label. This ASK labeling technique requires only low speed external modulators and low speed optical receivers to perform the label swapping mechanism, and does not require sophisticated optical components.

The data has a payload and a header. The payload is linecoded to remove low frequency components and the header is superimposed in the payload and with modulation depth of about 22% respective to the modulation depth of the payload.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2A is an optical power spectra diagram of a high-speed payload without linecoding and a superimposed low-speed ASK label;

FIG. 2B is an optical power spectra diagram of a high-speed payload with linecoding to remove low frequency components and a superimposed low-speed ASK;

DETAILED DESCRIPTION OF THE INVENTION

Figure 1:
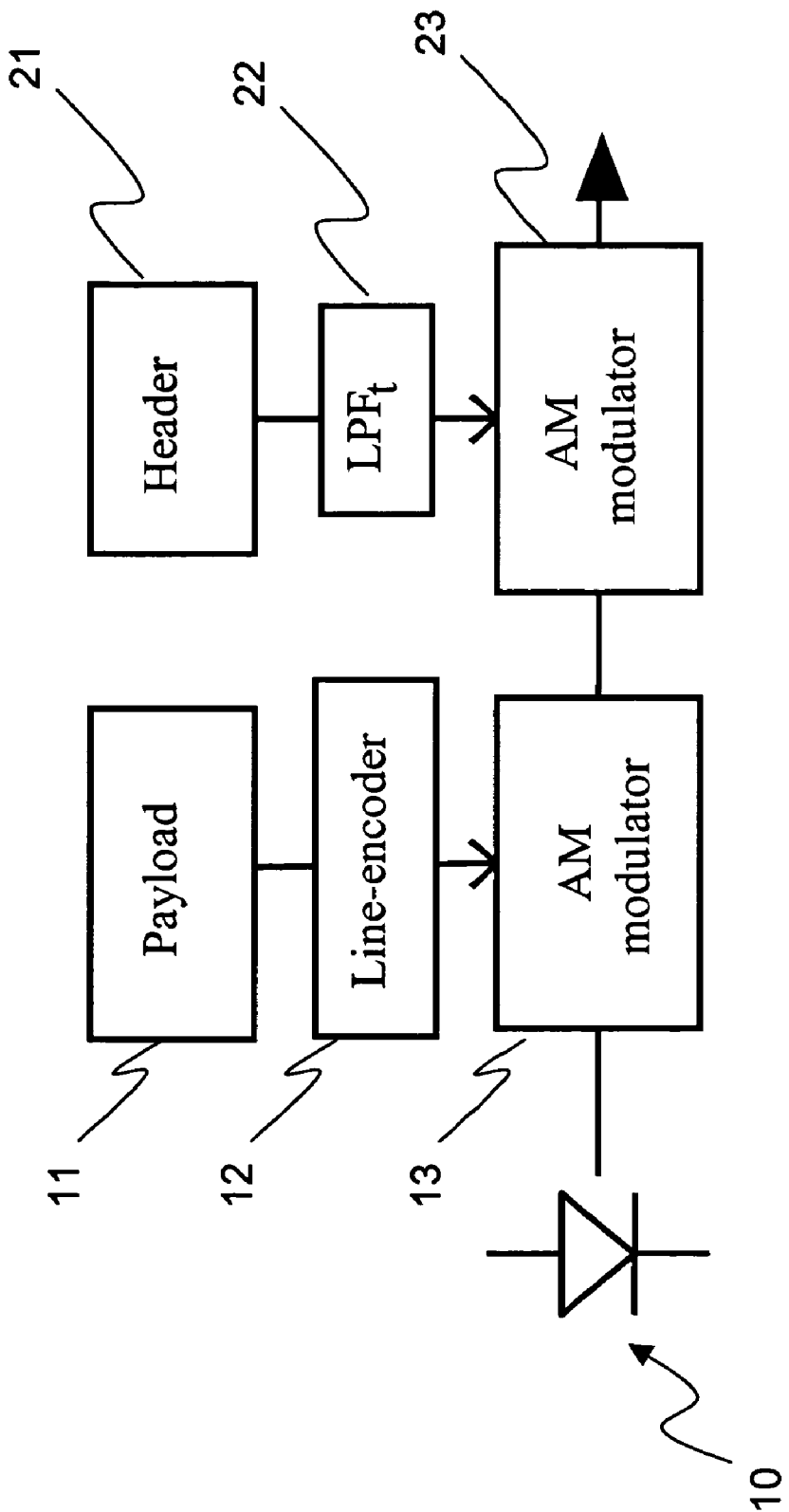
FIG. 1 is a diagram of an optical transmitter to generate a composite signal containing an ASK payload and an ASK label.
Figure 3:
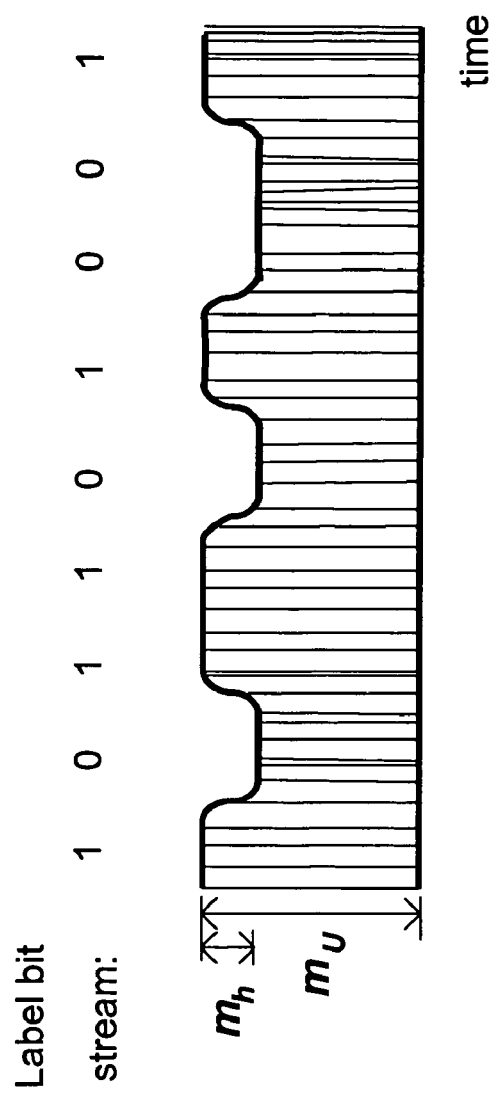
FIG. 3 is a time domain waveform diagram of the composite signal that contains high-speed payload data and a superimposed low-speed ASK header.

As shown in FIGS. 1, 2A and 3, a Continuous Wave (CW) light source 10 is first modulated by a high-speed NRZ payload 11 with a large modulation depth $m_L$, and subsequently modulated by a low-speed NRZ header 21 with a small modulation depth $m_h$. The modulation depth $m_h$ of the header 21 is about 20% respective to the modulation depth mu of the payload 11. A DC-balanced line-encoder 12 is adopted to suppress the low frequency energy of the payload signal, as shown in FIG. 2B. The header passes through the low pass filter 22, and then uses AM modulators 13 and 23 to form data transmission in high-speed packet switching networks. It can be seen in FIG. 2A that the header 21 has a poor signal to interference ratio (SIR) when it is transmitted together with a payload 11 with a random sequence, which is why a DC-balanced line encoder is needed. For example, we choose the 8B/10B line-coder because of its popularity in an Ethernet environment, and because of its bandwidth efficiency (only 25% extra bandwidth is required). For a 10 Gb/s coded payload, the actual payload information runs at 8 Gb/s. FIGS. 2A and 3 show typical power spectra and a three-level optical intensity waveform with a small label peak modulation depth $m_h$.

Selection of the proper modulation depth for a header (label) signal is important. This is because a label with a low modulation index cannot sustain multi-hop long-distance transmission due to payload interference and other transmission noise, while a label with a large modulation index can decrease the payload signal power (see FIG. 3), causing higher residual noise due to non-ideal label erasers.

Figure 4:
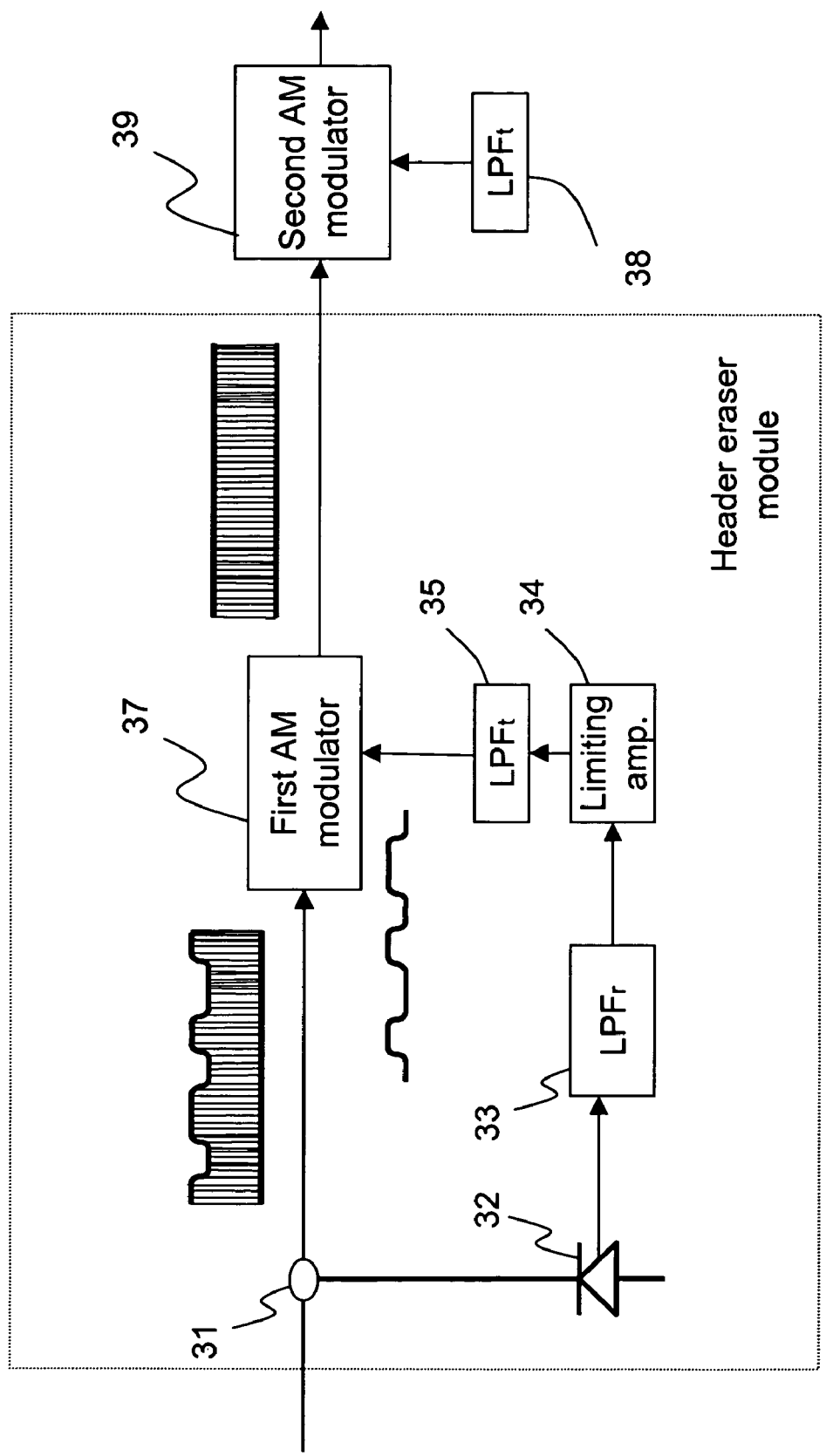
FIG. 4 is a diagram of a label swapping system composed of a label eraser and a new header modulator.

The system for optical-label-swapping is shown in FIG. 4, where we can see a header eraser module and a new header AM modulator. In the header eraser module, when receiving data the splitter 31 splits the data into two portions, first data and second data. The first data is received by the photodiode 32 and the second data is transmitted to the first AM modulator. Hence, only a portion of the input signal—the first data—is converted to electronic signals. A low pass filter (LPF$_r$) 33 is used to remove most of the payload signal and out-of-band noise of the first data, whereas a limiting amplifier 34 and a low pass transmitting filter (LPF$_t$) 35 are used to provide a constant amplitude and reshape the received label waveform, respectively. The LPF$_t$ 35 should have a frequency response close to that of the transmitting-end LPF$_t$ 22 (see FIG. 1) in order to inversely compensate the superimposed first header. Note that when the first header has a low error-rate performance, it can be considered an analog copy of the original header. We use this re-shaped header to reverse modulate the optical signal via the first AM modulator 37 with a negative logic and the same modulation depth $m_h$. In this way most of the incoming header can be removed. Then, the LPF$_t$ 38 with a frequency response close to that of the transmitting-end LPF$_t$ 22 (see FIG. 1) provides a new header. The second AM modulator 39 adds the new header to the second data whose second header is erased to form new data, and output the new data to the high-speed packet switching networks.

Figure 5:
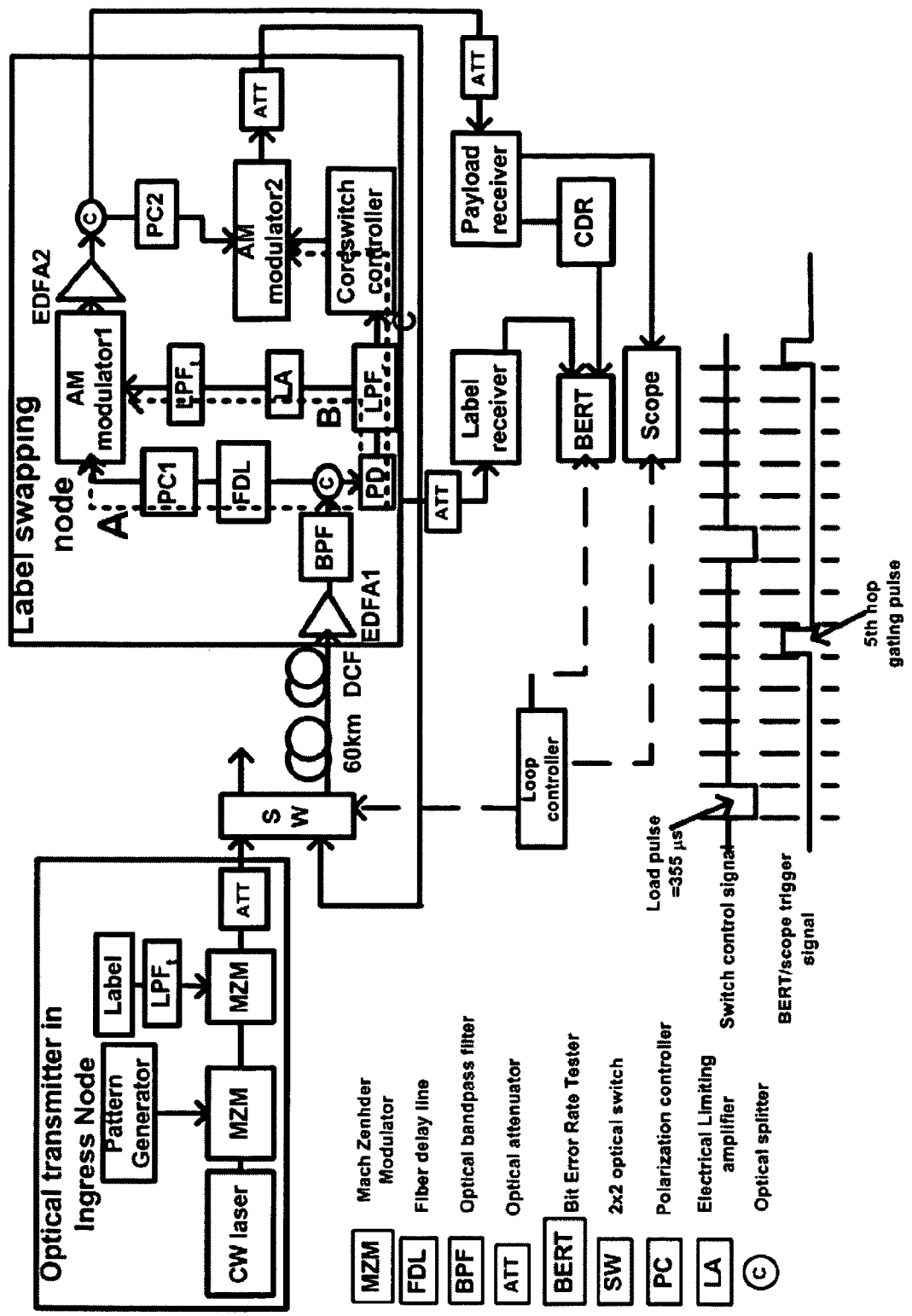
FIG. 5 is a diagram of experimental setup.

The experimental setup of a re-circulating loop, shown in FIG. 5, was built to test the feasibility and scalability of the proposed optical label swapping scheme. There is an optical transmitter, a payload receiver, a label receiver, and a 60 km re-circulating loop. The loop by itself consists of 60 km single mode fiber, a dispersion compensation fiber (DCF) module that provides a total compensation of −988 ps/nm, two EDFAs, and the label swapping apparatus. The input power to the 60 km fiber is kept below 0 dBm to minimize fiber non-linear effects. A 50 GHz optical bandpass filter is used to remove out-of-band ASE noise. The input power to EDFA1 and EDFA2 were −17 dBm and −7 dBm, respectively. An optical attenuator was used to carefully balance the gain and loss of the loop. The total loop propagation delay is 355 microseconds. A loop controller is programmed to provide gating signals to a 2×2 optical switch, a BER tester, and a sampling scope. The payload and label signal performance can thus be measured at any hop after any number of recirculation.

Figure 6:
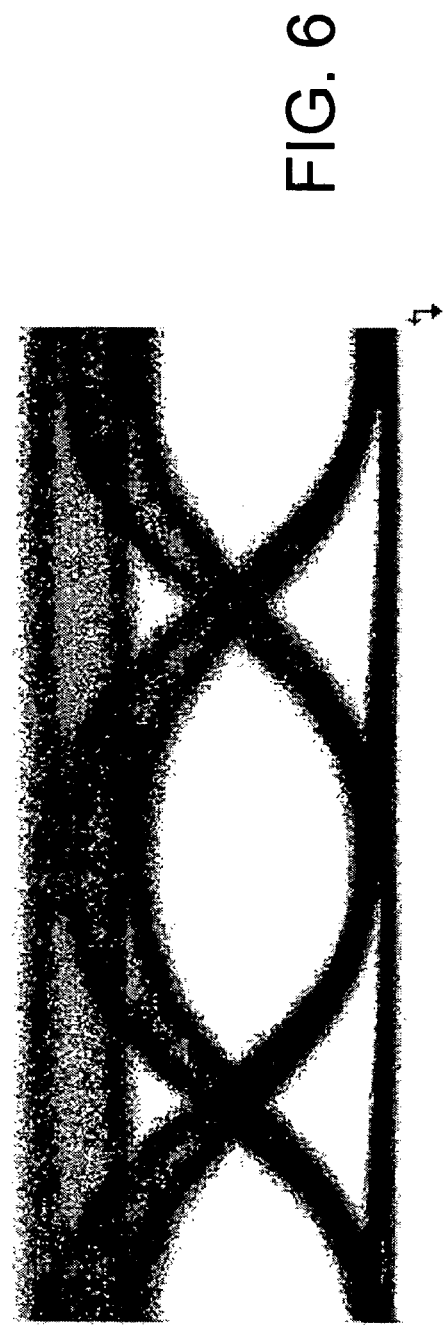
FIG. 6 is an eye diagram of a transmitted 8B/10B-coded 10 Gb/s payload that has a superimposed 100 Mb/s ASK label.
Figure 7:
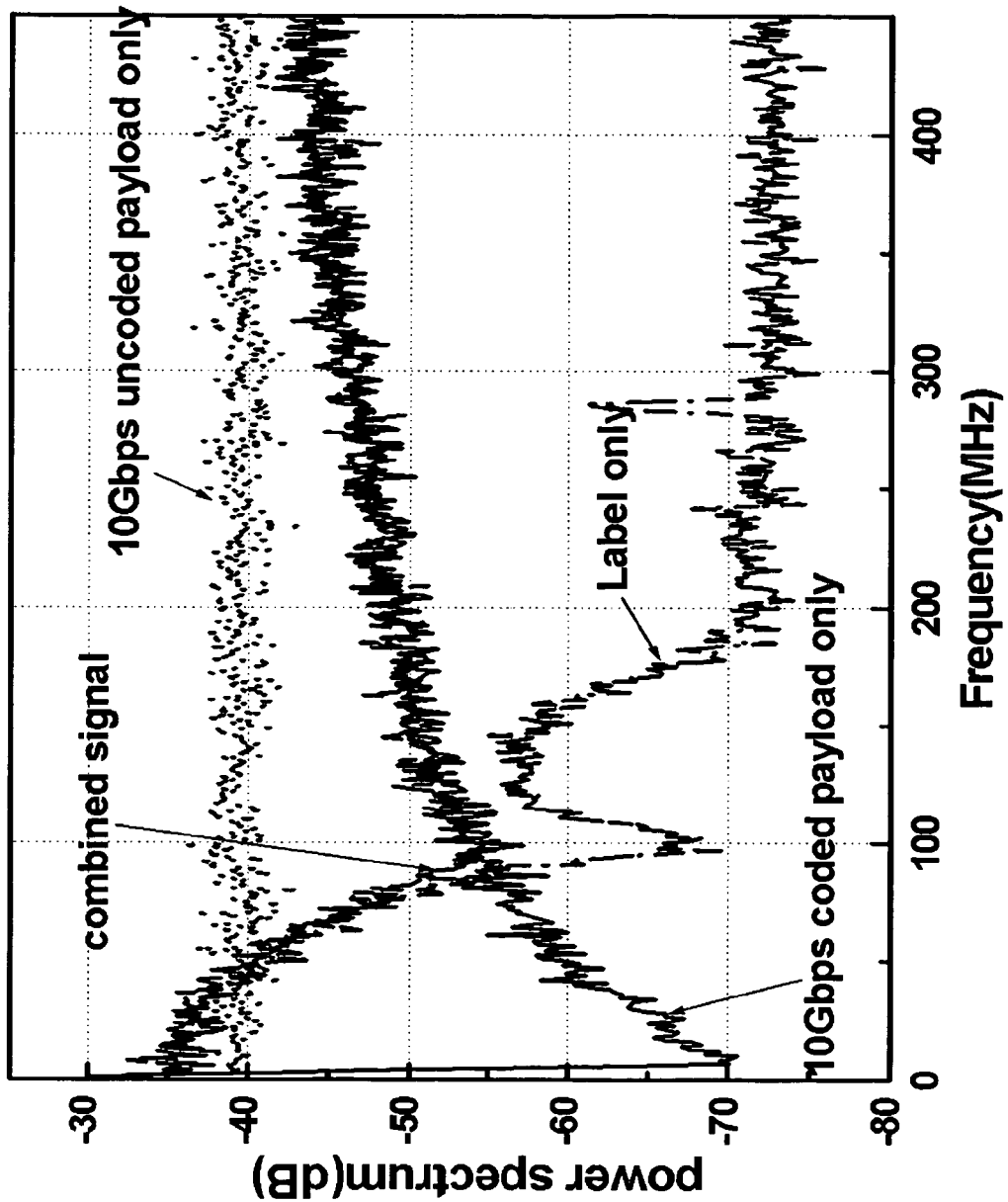
FIG. 7 is a power spectra diagram of a transmitted 100 Mb/s NRZ label, an 8B/10B coded 10 Gb/s payload, and their combination.

The optical transmitter is composed of a continuous wave (CW) laser and two LiNbO$_3$ external modulators. The first modulator is driven by an 8B/10B coded 10 Gb/s with a PRBS length of $2^{31}-1$ (again, the payload's raw data pattern length is unimportant because the 8B10B encoder limits the maximum run length to 5.). The second modulator is driven by a 100 Mb/s NRZ label signal with a PRBS length of $2^7-1$ and a modulation depth of $m_h=0.2$. Note that before the label signal is sent to the modulator, there is a Bessel pulse shaping filter (LPF$_t$) with a bandwidth $B_{ht}$ of 80 MHz. FIG. 6 shows the eye diagram of a transmitted 8B/10B-coded 10 Gb/s payload, which has a superimposed 100 Mb/s ASK label. FIG. 7 shows the measured power spectra of the transmitted 100 Mb/s NRZ label, 8B/10B coded 10 Gb/s payload, and their combination. Note in particular that the 8B/10B line code provides a low interference power to the label at a low frequency range.

At the input port of the re-circulating loop, an optical splitter is used to tap a portion of the optical power for receiving the old label. The label receiver has a 5$^{th}$-order front-end Bessel filter (LPF$_r$) with a 60 MHz bandwidth to remove most of the payload interference, a limiting amplifier and an additional 5$^{th}$-order low pass Bessel filter (LPF$_t$) to further amplify and reshape the received waveform, respectively, so that the analog copy of the old label can be obtained.

Figure 8:
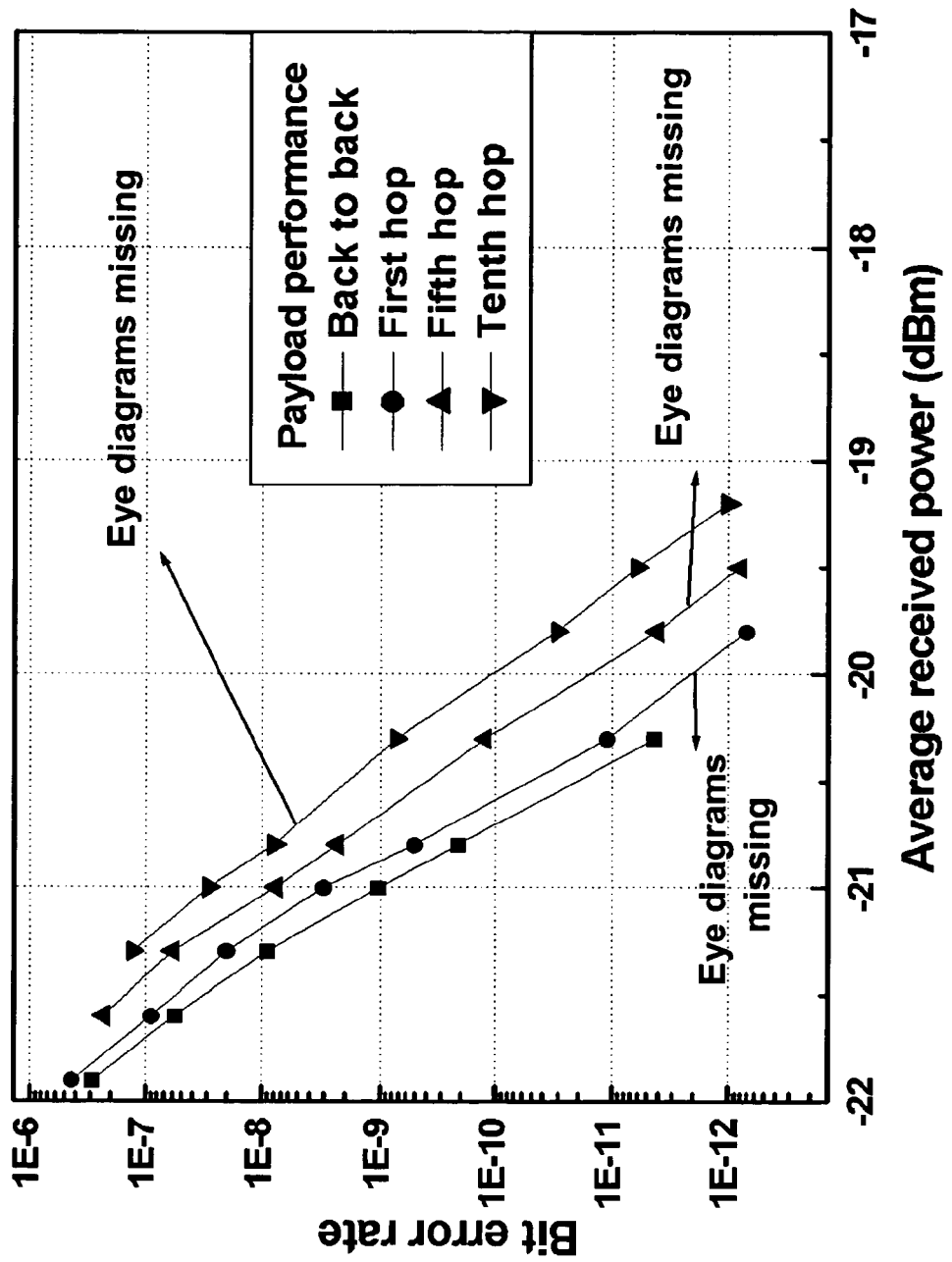
FIG. 8 is a diagram of measuring 8B 10B-coded 10 Gb/s payload BER performance in a multi-hop experiment.
Figure 9:
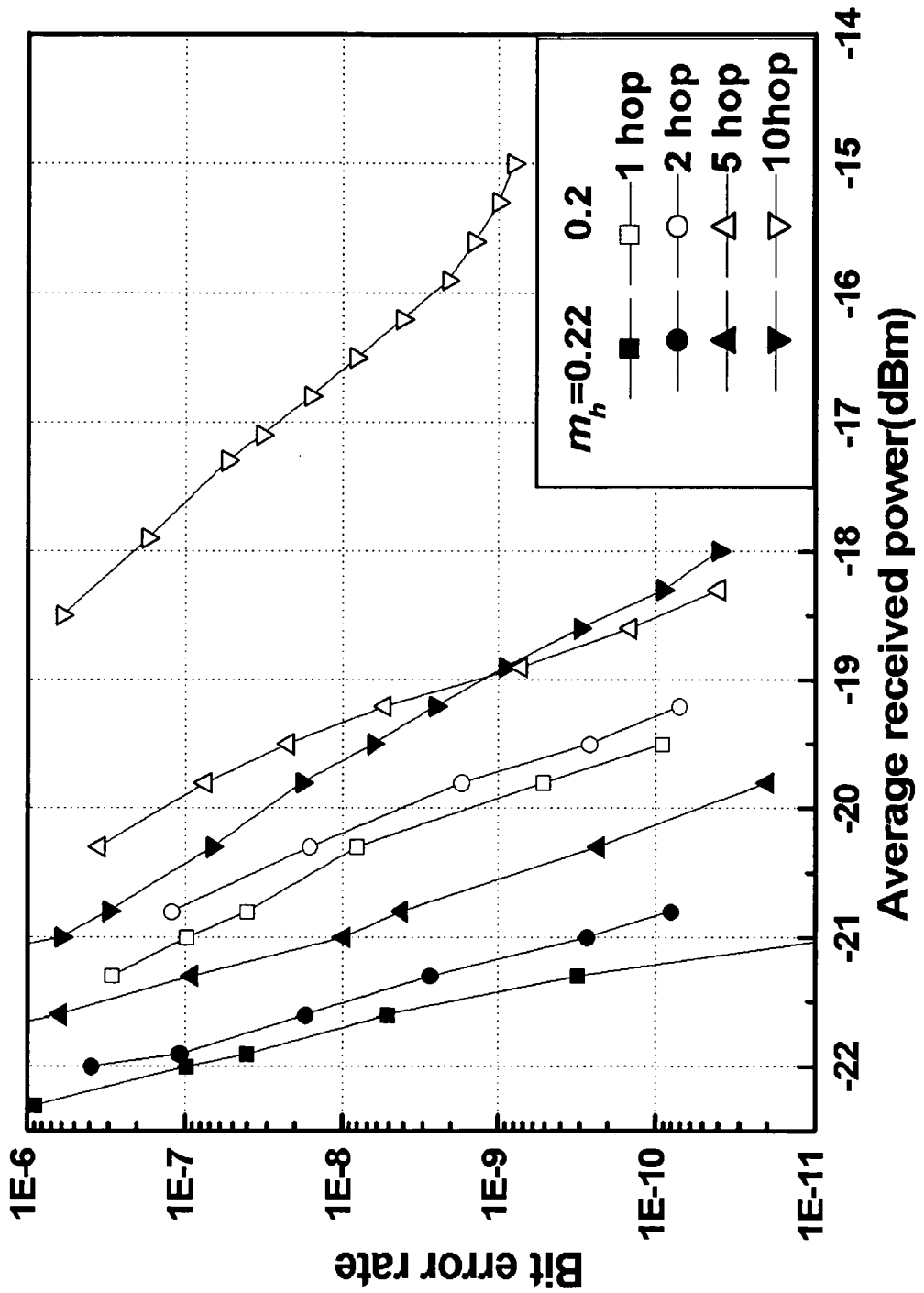
FIG. 9 is a diagram of measuring 100 Mb/s ASK label performance in a multi-hop re-circulating loop experiment.

FIGS. 8 and 9 show the multi-hop BER performances of the 8B/10B-coded 10 Gb/s payload and the 100 Mb/s ASK optical label, respectively. We can see that after 10 hops and a total transmission distance of 600 km, the payload receiver power penalty at a BER of $1\times10^{-9}$ is less than 0.8 dB. The eye diagrams of the 10 Gb/s payload after 1, 5, and 10 hops are shown in the insets of FIG. 15. No obvious signal degradation can be observed. The label BER performances after different numbers of hops and at modulation depths of 0.2 and 0.22 are shown in FIG. 16. We can see that after 10 hops and 600 km, the system power penalties are 4.5 and 2.5 dB at $m_h=0.2$ and 0.22, respectively. Note that an error floor occurs around a BER of $1\times10^{-9}$ when $m_h=0.2$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for swapping, in an optical label swapping system having a splitter, data transmitted in high-speed packet switching networks, comprising the step of:
   receiving, in the optical label swapping system, data containing a payload and a header superimposed in the payload;
   splitting said data in the splitter into first data and second data;
   low-pass filtering said first data to obtain a first header;
   inverting said first header;
   modulating said inverted first header and said second data to erase a second header of said second data;
   adding a new header to said second data whose said second header is erased to form new data; and
   outputting said new data.

2. The method of claim 1, wherein said header has a modulation depth of about 22% relative to a modulation depth of said payload.

3. The method of claim 1, wherein the low-pass filtering is performed in a low-pass filter of the optical label swapping system.

4. A system for optical-label-swapping data transmitted in high-speed packet switching networks, said data containing a payload and a header superimposed in the payload, the system comprising:
   a splitter, splitting said data into first data and second data;
   a low pass filter, low-pass filtering said first data to obtain a first header;
   a limiting amplifier, inverting said first header;
   a first modulator, modulating said inverted first header and said second data to erase a second header of said second data; and
   a second modulator, adding a new header to said second data whose said second header is erased to form new data.

5. The system of claim 4, further comprising a limiting amplifier for amplifying said first header.

6. The system of claim 5, further comprising a transmitter filter for reshaping said first header after amplifying.

7. The system of claim 4, further comprising a photodiode for receiving said first data to the low pass filter.

8. The system of claim 4, wherein said header superimposed in the payload has a modulation depth of about 22% relative to a modulation depth of said payload.

* * * * *